No. 872,066.
PATENTED NOV. 26, 1907.
F. W. JACKSON.
COMBINATION TOOL.
APPLICATION FILED APR. 23, 1907.
3 SHEETS—SHEET 1.
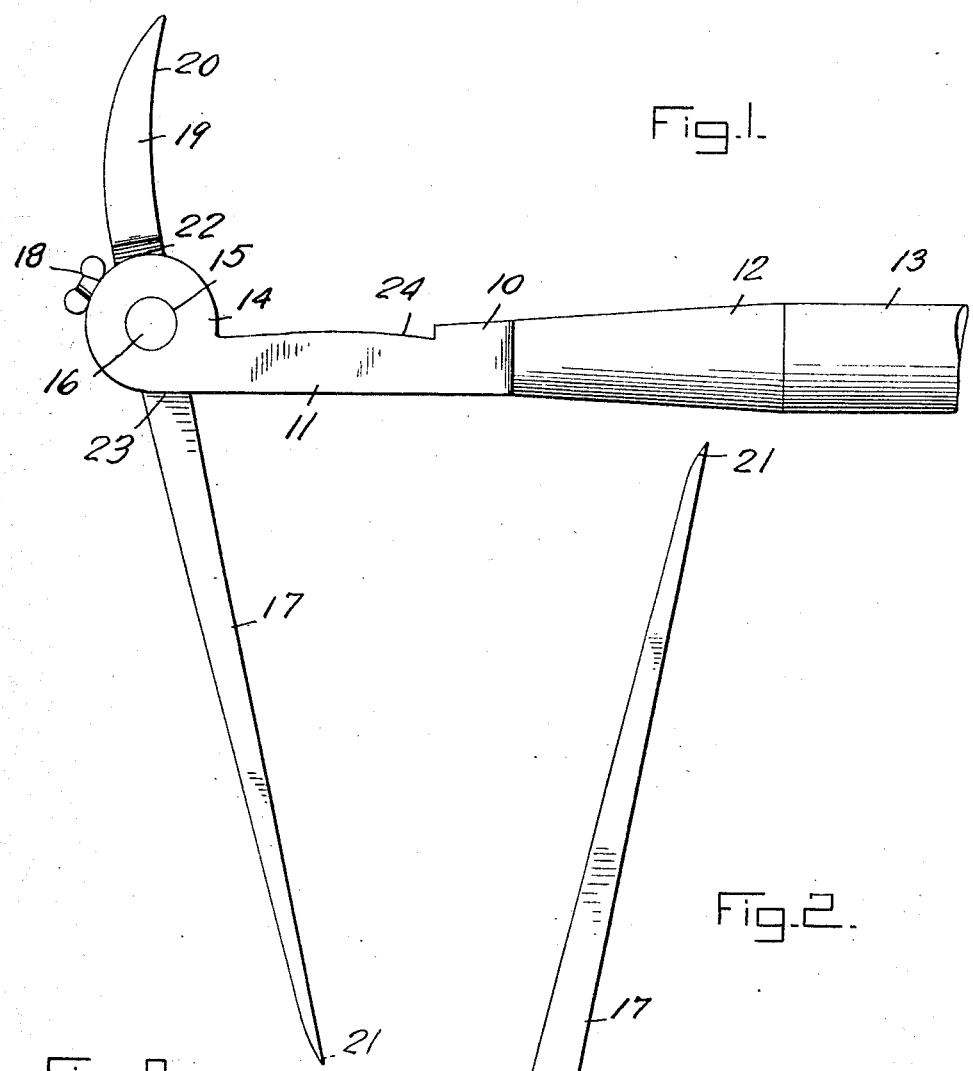
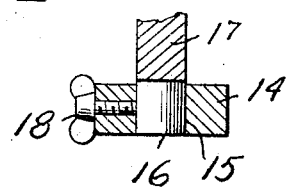

No. 872,066. PATENTED NOV. 26, 1907.
F. W. JACKSON.
COMBINATION TOOL.
APPLICATION FILED APR. 23, 1907.

3 SHEETS—SHEET 2.

Witnesses
G. R. Thomas
F. G. Smith

Inventor
Fred W. Jackson
By Chandler & Chandler
Attorneys

No. 872,066. PATENTED NOV. 26, 1907.
F. W. JACKSON.
COMBINATION TOOL.
APPLICATION FILED APR. 23, 1907.

3 SHEETS—SHEET 3.

Witnesses
G. R. Thomas
F. G. Smith

Inventor
Fred W. Jackson
By Chandler & Chandler
Attorneys

UNITED STATES PATENT OFFICE.

FRED W. JACKSON, OF HEARTWELL, NEBRASKA.

COMBINATION-TOOL.

No. 872,066.  Specification of Letters Patent.  Patented Nov. 26, 1907.

Application filed April 23, 1907. Serial No. 369,739.

To all whom it may concern:

Be it known that I, FRED W. JACKSON, a citizen of the United States, residing at Heartwell, in the county of Kearney, State of Nebraska, have invented certain new and useful Improvements in Combination-Tools; and I do hereby declare the following to be a full, clear, and exact description of the invention, such as will enable others skilled in the art to which it appertains to make and use the same.

This invention relates to combination garden tools and more particularly to a tool of such character that it may be adjusted for use as a rake, hoe or spade and will be securely held in either of its adjusted positions.

Broadly stated the tool comprises a head with which the handle is connected and a blade which is pivoted between the arms which are formed integral with the head, the blade being provided at one edge with teeth or tines and at its other edge being slightly sharpened so as to enable the device to be used as a hoe or spade as the occasion may require.

One of the novel features of the invention resides in the fact that the head is so constructed that when the tool is to be used as a spade, the teeth forming the rake portion of the tool will be protected against injury.

Figure 3:
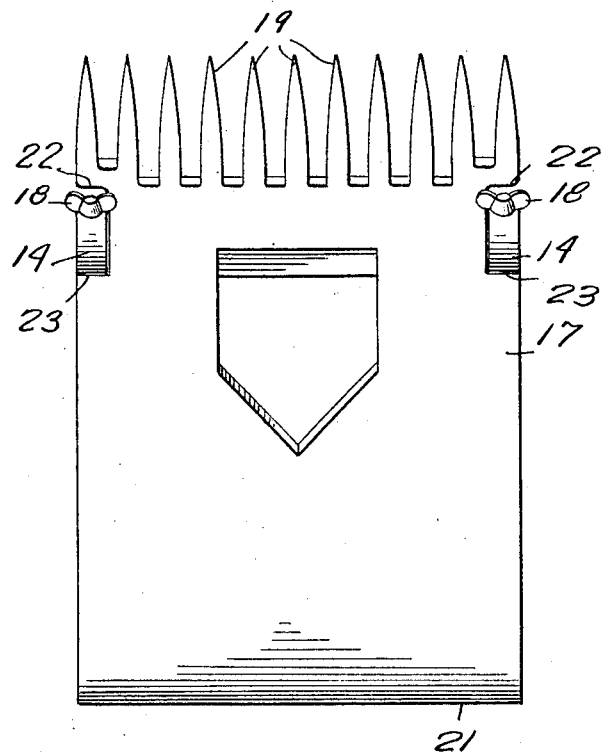
Figure 4:
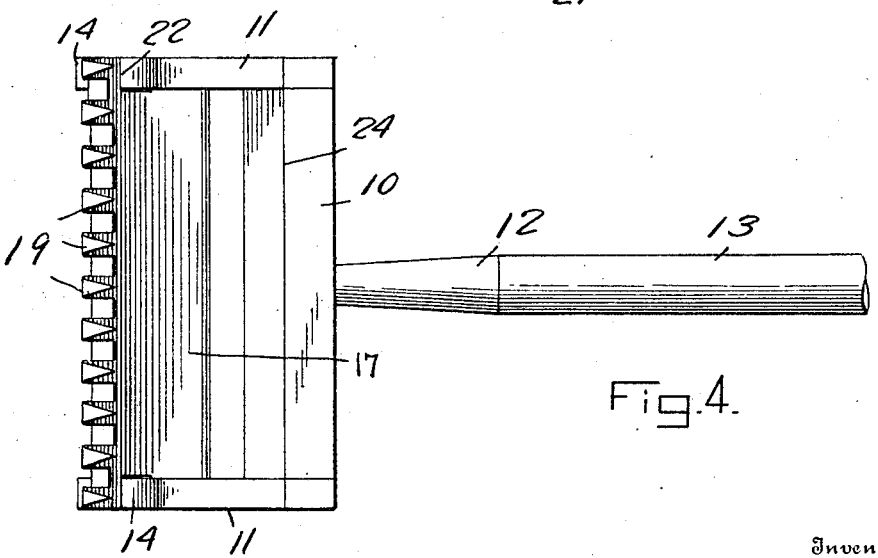
Figure 5:
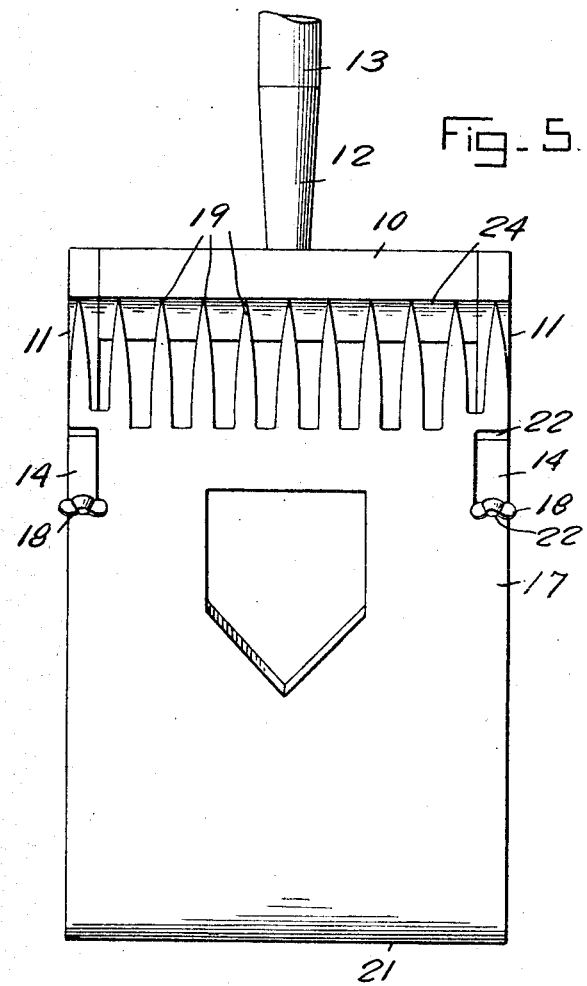
Figure 6:
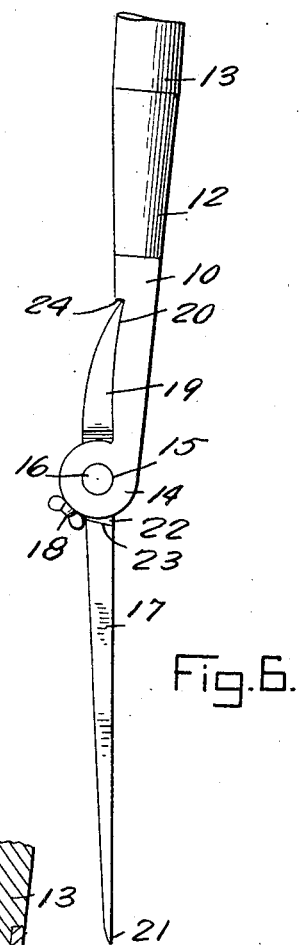
Figure 7:
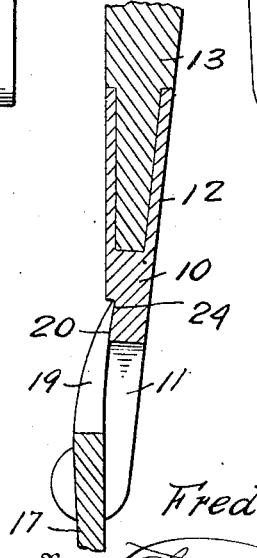

In the accompanying drawings, Figure 1 is a side elevation of the tool in position for use as a hoe, Fig. 2 is a similar view showing the tool in position for use as a rake, Fig. 3 is a front elevation of the tool when used as a hoe, Fig. 4 is a top plan view when adjusted for such use, Fig. 5 is a side elevation of the tool when adjusted for use as a spade, Fig. 6 is a front elevation of the tool when adjusted in this manner, Fig. 7 is a vertical sectional view through the tool in this position, and, Fig. 8 is a detail horizontal sectional view through a portion of the blade and the corresponding end of one of the arms between which the blade is pivotally mounted.

As shown in the drawings the tool comprises a head 10 which is provided at its ends with integral arms 11 which project from one longitudinal edge of the head and upon its other longitudinal edge with a tang or ferrule 12 for engagement into or for the reception of a handle 13 which may be of any desired form.

Formed at the outer end of each arm 11 is a flat circular enlargement or head 14 which is apertured as at 15 for the pivotal reception of a stud 16 formed integral with the adjacent longitudinal edge of the blade 17 of the tool and engaged through each head 14 is a set screw 18 which may be tightened to bear at its end against the corresponding stud 16 to hold the blade against movement with respect to the head it being understood of course that this permits of the blade being moved to any desired position and then being secured against displacement.

The studs 16 are formed adjacent one end edge of the blade 17 and formed integral with this edge are a number of tines or teeth 19 which are curved inwardly as at 20 at and adjacent their ends and are sharply pointed. The opposite end edge of the blade 17 is sharpened as at 21 so that the tool may be used as a spade.

From the foregoing description of my invention it will be observed that when the tool is to be used as a hoe, it is brought into a plane substantially at right angles to the head 10 and that when it is to be used as a rake it is reversed, it being understood of course that any desired adjustment may be made to bring the blade at any angle necessary with respect to the head.

In order to render the tool more substantial when being used as a rake the longitudinal edges of the blade are recessed adjacent the studs 16 as indicated at 22 and the heads 14 at the ends of the arms 11 are so located that the upper edges of the arms, when the tool is being used as a rake, are tangential to their heads and abut against the shoulder 23 formed by the said recesses in the longitudinal edges of the blade.

When the tool is to be used as a spade it is moved to lie substantially in a parallel plane with respect to the head 10 with the teeth 19 abutting against the rear face of the head it being understood that the positioning of the blade in this relation with respect to the head is permissible by reason of the fact that the heads 14 at the ends of the arm 11 are offset as heretofore stated. In order that the teeth 19 may be protected while the tool is being used as a spade and be thereby prevented from being dulled or from injuring the foot of the user of the tool, the said rear face of the head is provided with a transversely extending channel 24 which is deeper at that point in which the ends of the teeth seat and is gradually curved to merge with the remainder of the said face to conform to the curvature of the teeth 19.

From the foregoing description of my invention it will be observed that the blade is more securely held when the tool is being used as a rake or as a spade, these two uses being productive of greater strain upon the blade to move it from its adjusted positions than when the tool is being used as a hoe.

What is claimed is—

1. A combination garden tool comprising a head including integral arms, a handle connected with the head, a blade pivoted adjacent one of its ends between the arms, means for holding the blade at various adjustments, the blade being provided at one end with a plurality of teeth and having its opposite end edge sharpened whereby the blade may perform the function of a hoe or spade, and means upon the head whereby the teeth will be protected when the blade is adjusted to position to serve the function of a spade.

2. A combination garden tool comprising a head, a handle connected with the head, spaced arms extending from one longitudinal edge of the head at the ends thereof, a blade provided with recesses in its longitudinal edges and adjacent one end and with studs formed integral therewith and in the recesses, the arms being provided with offset apertured heads in the apertures of which the studs are pivotally received, the heads being received in the recesses formed in the longitudinal edges of the blade, and shoulders formed by the recesses being adapted to abut against the edges of the arms which extend tangential to the offset heads when the blade is adjusted to a plane at right angles to the head, set screws engaged through the heads and adapted to hold the blade at various adjustments, and teeth formed integral with that end edge of the blade adjacent which the studs are formed, one face of the head of the tool being provided with a channel adapted to receive the teeth and shield the same when the blade is adjusted to position to permit of use as a spade, the opposite end edge of the blade being sharpened for such use.

In testimony whereof, I affix my signature, in presence of two witnesses.

FRED W. JACKSON.

Witnesses:
  C. H. ROSSMAN,
  A. G. JACKSON.